(12) United States Patent
Pashley et al.

(10) Patent No.: US 6,264,346 B1
(45) Date of Patent: Jul. 24, 2001

(54) APPARATUS FOR MIXING LIGHT FROM DIFFERENT COLOR LEDS

(75) Inventors: Michael D. Pashley, Cortlandt Manor; Thomas Marshall, Hartsdale; Stephen Herman, Monsey, all of NY (US)

(73) Assignee: Philips Electronics North America Corp., New York, NY (US)

( * ) Notice: Subject to any disclaimer, the term of this patent is extended or adjusted under 35 U.S.C. 154(b) by 0 days.

(21) Appl. No.: 09/406,287

(22) Filed: Sep. 24, 1999

(51) Int. Cl.$^7$ .................................................. F21V 5/00

(52) U.S. Cl. ..................... 362/244; 362/241; 362/244; 362/245; 362/247; 362/327; 362/331; 362/348

(58) Field of Search ................... 362/230, 231, 362/327, 247, 245, 244, 241, 246, 235, 268, 331, 332, 348, 346, 330, 339

(56) References Cited

U.S. PATENT DOCUMENTS

| | | | | |
|---|---|---|---|---|
| 1,193,999 | * | 8/1916 | Dixon | 362/282 |
| 5,174,649 | * | 12/1992 | Alston | 362/244 |

\* cited by examiner

*Primary Examiner*—Sandra O'Shea
*Assistant Examiner*—Bertrand Zeade
(74) *Attorney, Agent, or Firm*—Dicran Halajian

(57) ABSTRACT

A faceted surface has first and second facets which deflect respective first and second light beams to produce first sub-beams which alternate with second sub-beams. The faceted surface may be a reflector having first facets at 120° to second facets for mixing light beams which are incident at 120° to each other. 100% of reflected sub-beams from each source alternate with 100% of sub-beams from the other source. The faceted surface may also be a refractor which is part of a transparent block having two parallel faceted surfaces. A first refractive surface refracts parallel light beams to produce diverging beams which are each split into spaced apart sub-beams by the second refractive surface. 50% of refracted sub-beams originating from each source alternate with 50% of refracted sub-beams of each adjacent source.

14 Claims, 5 Drawing Sheets

APPARATUS FOR MIXING LIGHT FROM DIFFERENT COLOR LEDS

BACKGROUND OF THE INVENTION

The invention relates to apparatus for mixing light from different color lamps, in particular to produce white light.

The standard light source for small to moderate size narrow beam lighting for accent lighting and general illumination is the incandescent/halogen bulb, such as a PAR (parabolic aluminized reflector) lamp. These sources are compact and versatile, but they are not very efficient. A given lamp operates at a given color temperature for a fixed power, and while they are dimmable, the color temperature shifts with applied power according to the blackbody law, which may or may not be the variation that the user desires.

An array of LEDs in each of a plurality of colors offers the possibility of creating a luminaire in which the color temperature may be controlled at any power level, thereby enabling a lamp which is dimmable and emits a uniformly white light at any power level.

U.S. application Ser. No. 09/338,997 filed Jun. 24, 1999 discloses apparatus having beam splitters which mix light from an array of different color LEDs. A square array of four LEDs is arranged so that each pair emits light toward an opposite side of a semi-reflective layer at 45°, and a pair of mixed light beams is transmitted from each side at 45°. A second identical stage mixes the two pairs of mixed beams so that four identical mixed beams emerge in parallel as white light. The semi-reflective surface may be approximated by a checkerboard pattern of fully reflective and fully transmissive areas which are sufficiently small that emerging sub-beams cannot be resolved and appear to be fully mixed.

SUMMARY OF THE INVENTION

The invention, like the prior art discussed above, has for its object to mix light from different colored LEDs, e.g. red, green, and blue, to produce white light. The apparatus according to the invention mixes light beams input from up to four different sources, provided that the sources have the same initial beam profiles.

The invention takes a different approach from the prior art. According to the invention, a faceted surface has a plurality of parallel first facets alternating with a plurality of parallel second facets to form a sawtooth pattern. The facets are arranged so that a first light beam incident on the first facets and parallel to the second facets will be deflected by the first facets as a plurality of spaced apart first sub-beams, and so that a second light beam incident on the second facets and parallel to the first facets will be deflected by the second facets as a plurality of spaced apart second sub-beams. The first sub-beams alternate with the second sub-beams, and all sub-beams are parallel.

According to a first embodiment, the faceted surface is a first. reflective surface, each pair of first and second facets having an angle of 120° therebetween, the first and second light beams each having an angle of incidence of 30° to the normals of the facet surfaces. All sub-beams are therefore reflected at 30° to these normals and emerge in parallel. The output beams have the same angular distribution as the input beams. Therefore, if the input color beams are highly collimated, the output white beams will also be highly collimated.

An identical second reflective surface may be arranged to reflect third and fourth light beams as alternating parallel sub-beams. A third substantially identical surface has first facets which receive the mixed sub-beams from the first reflective surface, and second facets which receive the sub-beams from the second reflective surface. The third reflective surface reflects all of the sub-beams in parallel.

According to a second embodiment, the faceted surface is a refractive surface which refracts each input beam into spaced apart parallel sub-beams. For two light sources which transmit light parallel to the first and second facets, the first sub-beams alternate with the second sub-beams in an overlapping area. According to a preferred variation of the second embodiment, the faceted surface is a second refractive surface, and a first refractive surface is provided parallel to the second refractive surface. For light sources which transmit parallel input beams perpendicular to the first refractive surface, the facets of the first surface refract each input beam into a pair of diverging first and second beams which are incident on respective first and second facets of the second refractive surface. For each pair of light beams incident on the first refractive surface, 50% of the first sub-beams alternate with 50% of the second sub-beams. For a linear array of pairs, this alternation or overlap will increase with the number of pairs in the array.

The first and second refractive surfaces are preferably formed on opposite sides of a first solid refractive splitting element. For a square array of light sources, an identical second splitting element is arranged parallel to the first element and rotated 90°. Where a 6×6 array of light sources is provided, a 7×7 array of sub-beams will be output with a 5×5 array of mixed sub-beams.

According to all embodiments the period (peak to peak spacing) of the facets is sufficiently small that the individual sub-beams of color cannot be resolved by an observer. The resulting white light is thus an apparent white light, much the same as a white field on a color CRT screen, which is actually a mixture of red, green, and blue. The two stage mixers according to the invention typically produce red/green and blue/green mixed beams in the first stage, and white beams approximated by a mixture of red/green and blue/green beams in the second stage.

The beam mixing apparatus of the present invention may offer manufacturing efficiencies which render it more suitable than the prior art for some applications.

DETAILED DESCRIPTION OF THE PREFERRED EMBODIMENT

Figure 1:
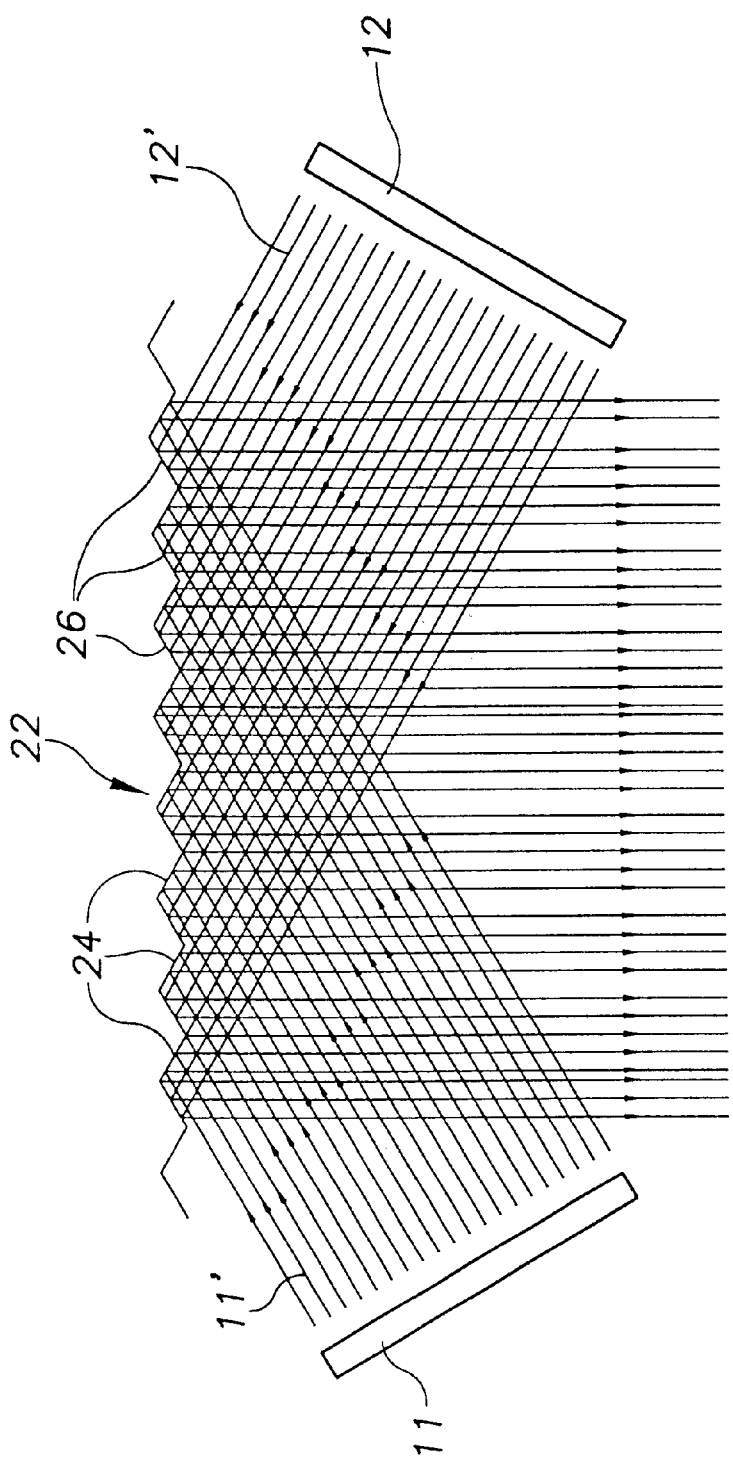
FIG. 1 is a schematic illustrating the principle of a faceted reflector for mixing two incident light beams.

FIG. 1 shows a reflective surface 22 for mixing two collimated light beams 11', 12' from two different color LED light sources 11, 12. While shown as single elements 11, 12, it will be apparent that either light source could be an array of smaller elements.

The reflective surface 22 is a faceted surface comprising a first set of facets 24 alternating with a second set of facets 26. The facets and light sources are arranged so that each input beam hits only one set of facets. The beam 11' hits first facets 24 and is reflected as a plurality of spaced apart first sub-beams, while the beam 12' hits second facets 26 and is reflected as a plurality of spaced apart second sub-beams. The resulting output beam consists of a plurality of first sub-beams alternating with a plurality of second sub-beams, all sub-beams being parallel and normal to the plane of the faceted surface 22.

The size of the facets on the reflector plate should be sufficiently small that the individual beams of color cannot be resolved; this is the principle of a white field on a color CRT screen. In practice the period of the facets is preferably 0.1 to 0.3 mm, and can be as small as is practical to manufacture.

For an incoming beam to be parallel to the opposite set of facets, the facets must have an angle of 120° therebetween. This results in an angle of incidence of 30° on the reflectors for the incoming beams. In practice, the input beams will not be perfectly collimated; the spread will result in some of the light hitting the wrong set of facets. Reducing the angle between the two sets of facets to less than 120° can minimize this. The angle of incidence increases, and one set of facets is shielded from each input beam.

Figure 2:
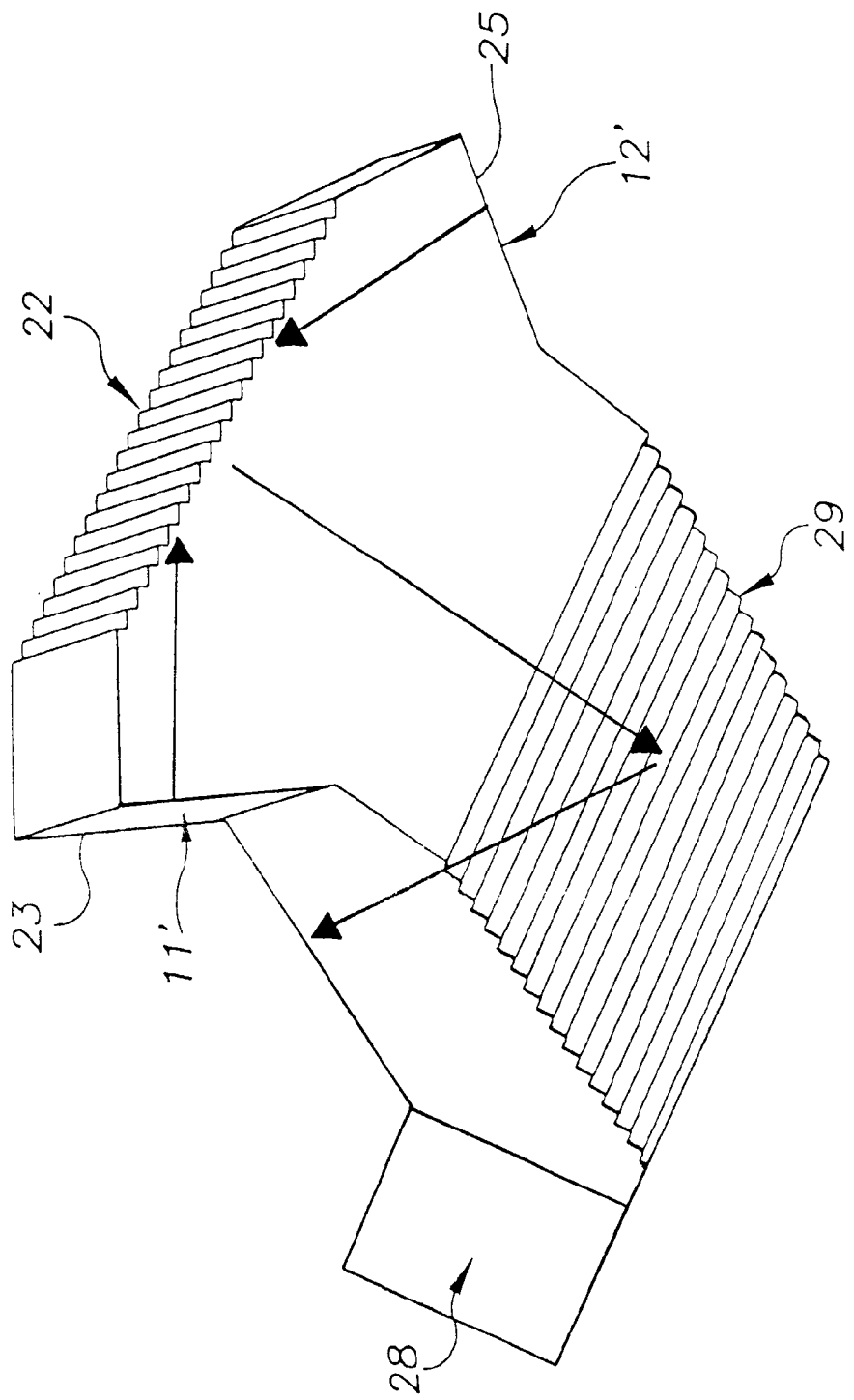
FIG. 2 is a perspective of a two-stage mixing block having three faceted reflectors for mixing four incident light beams.

The two beam mixer described in conjunction with FIG. 1 can be extended to mix up to four beams by mixing in two stages. FIG. 2 shows a configuration for achieving this using a plastic block having a first faceted surface 22 and an identical second faceted surface 28 which serve as a first stage mixer, and a third faceted surface 29 which serves as a second stage mixer. The input beams 11' and 12' for one of the first stage mixers, which are typically different colors such as red and green, enter the block through respective windows 23, 25 and strike the facets 24, 26 as shown in FIG. 1. The input beams for the other two stage mixer which are typically different colors such as blue and green, enter through like windows and strike like facets of the second facet surface 28. The first stage output beams serve as input beams for the third stage mixer 29, which is substantially identical to the faceted surface of the first stage mixer, but for the possibility of having a different area.

The reflective surfaces 22, 28, 29 are coated with reflective material on the outside of the plastic block. The four beams which enter the block, only exit when mixing is complete. It is also possible to construct a four beam mixer from separate faceted reflective plates, so that the light path is entirely in air.

Figure 3:
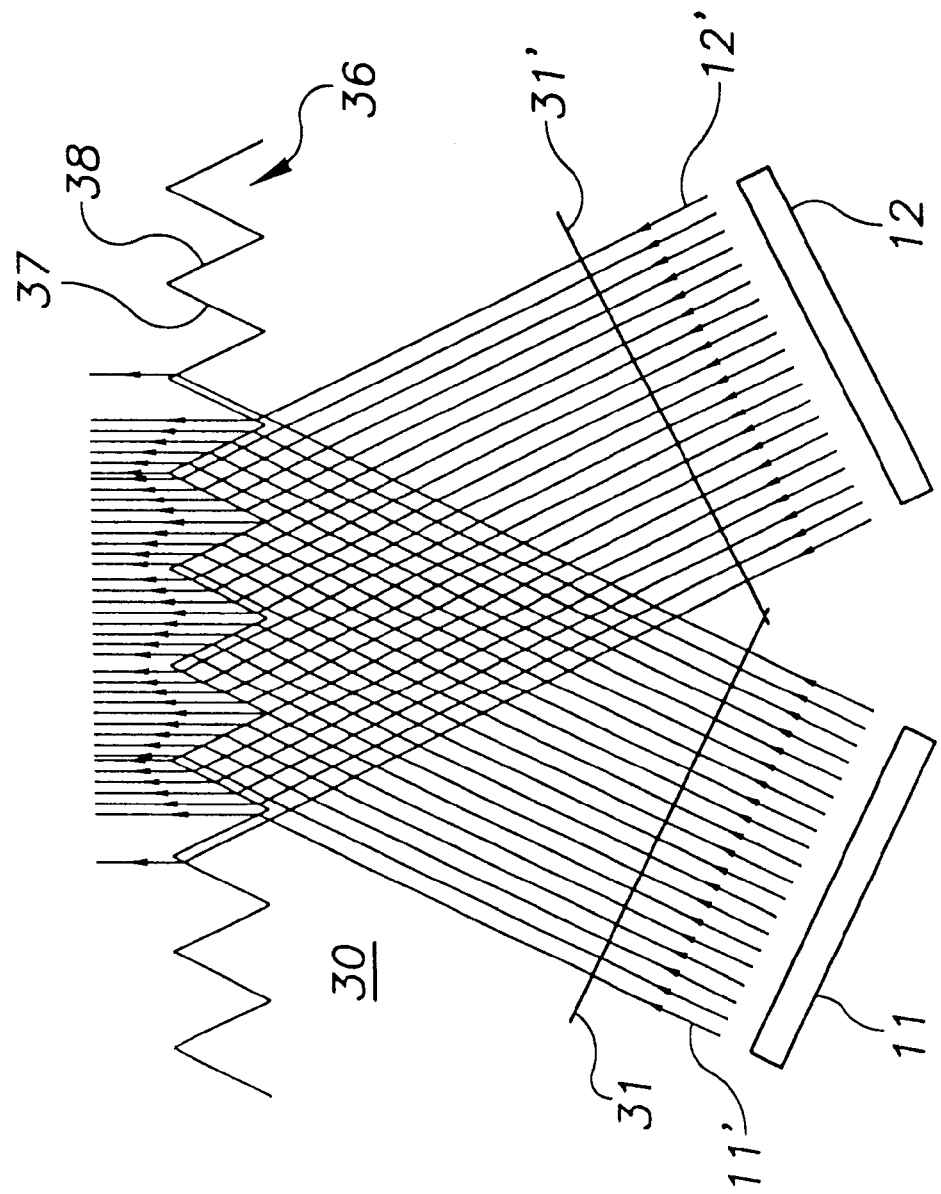
FIG. 3 is a schematic illustrating the principle of a faceted refractor which mixes two incident light beams.

FIG. 3 shows a refractive mixing element in the form of a molded plastic block 30 for mixing two collimated light beams 11', 12' from two different color LED light sources 11, 12. The beams 11', 12' enter the block normally of respective windows 31, 31' and strike the facets 38, 37. The first facets 37 refract incident light into a plurality of parallel first sub-beams, and the second facets 38 refract incident light into a plurality of parallel second sub-beams which alternate with the first sub-beams to give a mixed output. This embodiment can also be used to mix four beams using two stages, as described for the reflective case, although the geometry is slightly different.

Figure 4:
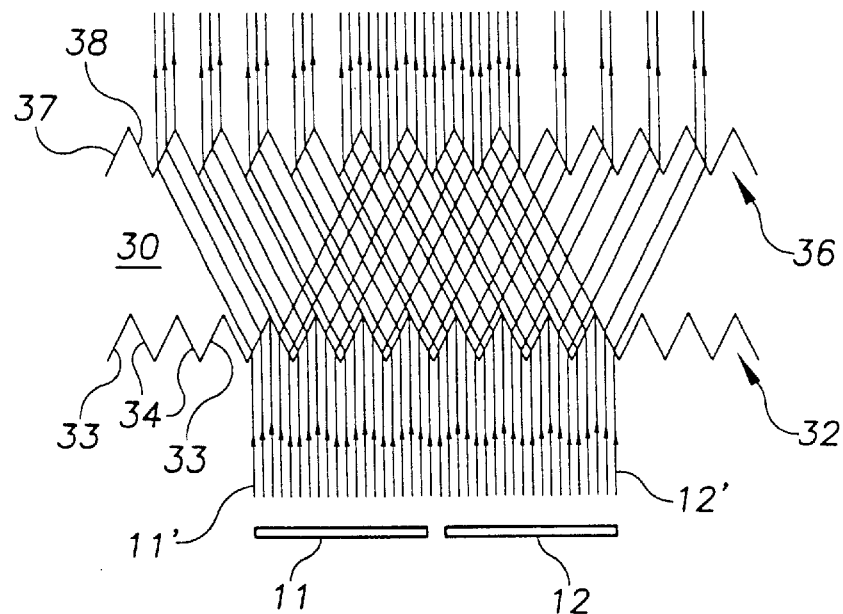
FIG. 4 is a schematic of a faceted refractor having parallel surfaces for splitting and mixing parallel input beams.

FIG. 4 shows a preferred embodiment of refractive element in the form of a molded plastic block 30 having a first refractive surface 32, and an opposed, parallel second refractive surface 36. The first refractive surface 32 consists of parallel first facets 33 which alternate with parallel second facets 34, which facets split the light from each source 11, 12 into two diverging beams inside the block. The second refractive surface consists of parallel first facets 37 which receive one of the diverging beams, and parallel second facets 38 which receive the other diverging beam. The first facets 37 refract incident light into a plurality of parallel first sub-beams, and the second facets 38 refract incident light into a plurality of parallel second sub-beams. All of the sub-beams emerge from the second refractive surface in parallel. The second sub-beams originating from the first source alternate with the first sub-beams from the second source to give a mixed output flanked by non-mixed outputs. The top (second) and bottom (first) refractive surfaces are identical, and no registration between the two surfaces is required.

The separation of the two surfaces 32, 36 is determined by the source size and is set such that half of the light from each of two adjacent sources exactly overlaps. The period of the prismatic structure (distance between facet peaks) is not critical. It needs to be small enough that it is not observable in the application, and large enough that manufacturing imperfections do not reduce the efficiency. Typically the period is 0.1 to 0.3 mm.

The angle θ of the prism facets, i.e. the angle between the facet and the plane of the refractive splitter, is set such that each beam inside the splitter is parallel to one of the sets of facets. The controlling equation is $$2 \sin^2 \theta - (n_1/n_2) \sin \theta - 1 = 0$$

where $n_1$ is the index of refraction of the material outside the splitter, usually air, and $n_2$ is the refractive index of the refractive splitter. For a typical $n_2$ of 1.5, θ=63°. This results in a high angle of refraction, so the Fresnel losses on both entry and exit surfaces are high—typically about 11% for each surface. The efficiency of this mixing scheme would therefore benefit from an anti-reflection coating. Beam spread will result in some light hitting the wrong facets, causing distortion to the beam profile. Increasing the angle θ can reduce the distortion, but will Is result in an increase in Fresnel losses.

Instead of a solid splitting element 30, the refractive splitter of FIG. 4 can be made out of two thin plates with an air gap between them. This would make the system cheaper, but would result in Fresnel losses.

Figure 5:
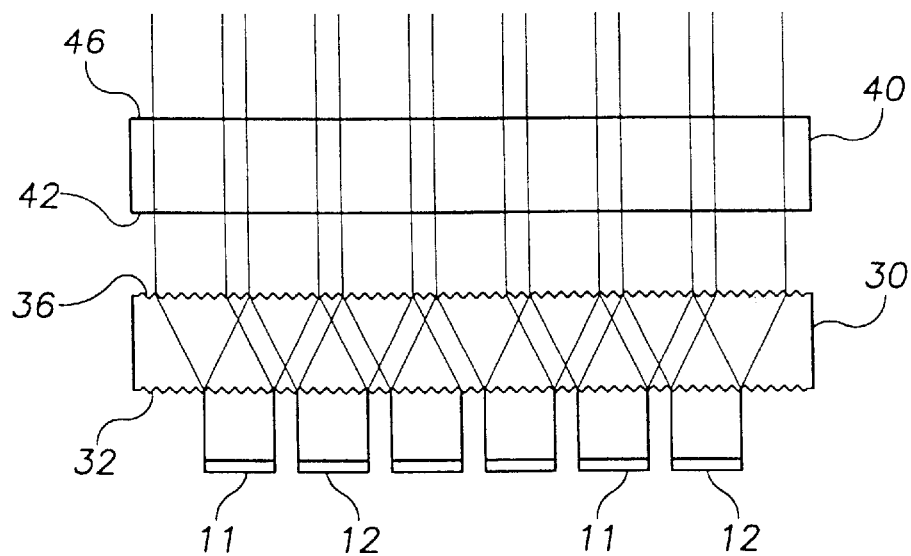
FIG. 5 is an elevation of a two stage faceted refractor which splits and mixes a square grid of 36 LED light sources.
Figure 6A:
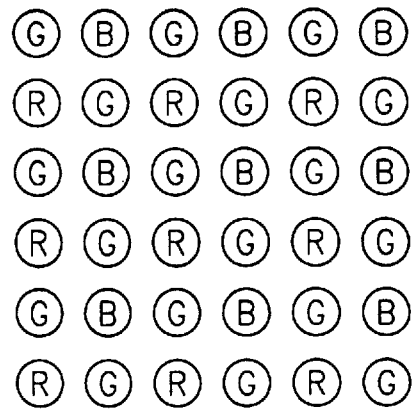
FIG. 6A is a schematic plan view of the input beams emitted by the 36 LED light sources.
Figure 6B:
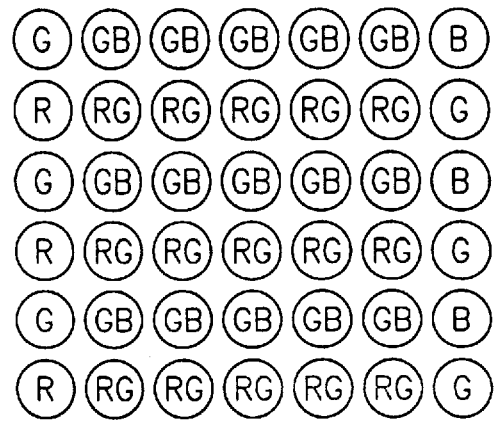
FIG. 6B is a schematic of the output beams emerging from the first stage of the refractor of FIG. 4.

FIG. 5 shows an arrangement of two refractive splitters 30, 40 for mixing light from a square array of light sources consisting of rows of red and green LEDs alternating with rows of green and blue LEDs; see also FIG. 6A. The first refractive splitter 30 has elongate facets arranged perpendicular to the plane of the paper, and mixes the input beams of FIG. 6A to produce output beams of FIG. 6B. The colors red, green, and blue are symbolized by the letters R, G, and B, and mixed beams, which consist parallel sub-beams, are symbolized by letter pairs RG and GB.

Figure 6C:
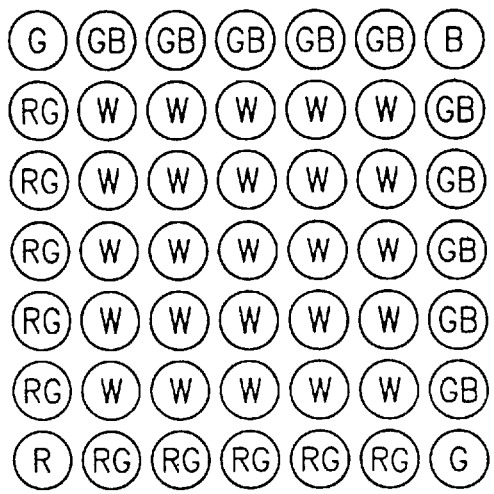
FIG. 6C is a schematic of the output beams emerging from the second stage of the refractor of FIG. 4.

The second refractive splitter 40 is identical to the first refractive splitter 30, but is rotated 90° so that the facets are arranged parallel to the plane of the paper. There is no lower limit to the distance between splitters. The second splitter 40 receives the output beams of the first splitter 30 and mixes them to produce the output beams of FIG. 6C. Here the letter W symbolizes white, which is a non-resolvable mix of red, green, and blue. Light from LEDs at the perimeter of the array is not fully mixed to yield white light. This can be considered an efficiency loss, which becomes fractionally smaller as the array gets larger.

The foregoing is exemplary and not intended to limit the scope of the claims which follow.

What is claimed is:

1. Apparatus for mixing light beams, said apparatus comprising a faceted surface comprising a plurality of parallel first facets alternating with a plurality of parallel second facets to form a sawtooth pattern, said facets being arranged so that a light beam incident on said first facets parallel to said second facets will be deflected by said first facets as a plurality of spaced apart first sub-beams, and so that a light beam incident on said second facets parallel to said first facets will be deflected by said second facets as a plurality of spaced apart second sub-beams, and so that said first sub-beams will alternate with said second sub-beams and be parallel thereto, a first LED light source which emits a first collimated input beam which is incident on said first facets substantially parallel to said second facets, and a second LED light source which emits a second collimated input beam which is incident on said second facets substantially parallel to said first facets.

2. Apparatus as in claim 1 wherein said faceted surface is a reflective surface, whereby said first and second input beams are reflected by said first and second facets as parallel first and second sub-beams.

3. Apparatus as in claim 2 wherein said reflective surface is a first reflective surface, said apparatus further comprising a second reflective surface which is identical to said first reflective surface, a third LED light source which emits a third collimated input beam which is incident on said first facets of said second reflective surface substantially parallel to said second facets thereof, a fourth LED light source which emits a fourth collimated input beam which is incident on said second facets of said second reflective surface substantially parallel to said first facets thereof, and a third reflective surface which is substantially identical to said first and second reflective surfaces, said third reflective surface having first facets arranged to receive parallel first and second sub-beams reflected by said first reflective surface, and second facets arranged to receive parallel first and second sub-beams reflected by said second reflective surface, said third reflective surface reflecting all of said sub-beams in parallel.

4. Apparatus as in claim 2 wherein each pair of first and second facets has an angle of 120° therebetween, whereby said input beams each have an angle of incidence of 30° on respective said first and second facets.

5. Apparatus as in claim 1 wherein said faceted surface is a refractive surface, whereby said first and second input beams are refracted by said first and second facets as parallel first and second sub-beams.

6. Apparatus as in claim 5 wherein said refractive surface is a second refractive surface, said apparatus further comprising a first refractive surface which is substantially parallel to said second refractive surface and comprises a plurality of parallel first facets alternating with a plurality of parallel second facets to form a sawtooth pattern, said facets of said first refractive surface being arranged so that parallel light beams incident thereon at the same angle of incidence will be refracted by said first facets toward said first facets of said second faceted surface parallel to said second facets thereof, and by said second facets toward said second facets of said second faceted surface parallel to said first facets thereof, and said first and second LED light sources are arranged to emit said first and second input beams in parallel toward said first refractive surface.

7. Apparatus as in claim 6 wherein said first and second faceted surfaces are formed on opposite sides of a first solid refractive splitting element.

8. Apparatus as in claim 7 further comprising a second solid refractive splitting element which is identical to the first solid refractive splitting element, said second solid refractive splitting element being parallel and rotated 90° with respect to the first splitting element, and third and fourth LED light sources forming a square grid with said first and second LED light sources and arranged to emit collimated third and fourth input beams substantially in parallel with said first and second input beams toward said first faceted surface of said first solid refractive splitting element.

9. Apparatus as in claim 8 comprising a like plurality of each of said first, second, third, and fourth LED light sources arranged in a square grid.

10. Apparatus as in claim 8 wherein the first and second LEDs emit light of different colors, and the third and fourth input beams emit light of different colors.

11. Apparatus as in claim 7 wherein said faceted surfaces are parallel to a central plane, and each of the facets forms an angle θ with the central plane, and θ is given by the equation $$2 \sin^2 \theta - (n_1/n_2) \sin \theta - 1 = 0$$

where $n_1$ is the refractive index of the medium outside the solid element and $n_2$ is the refractive index of the solid element.

12. Apparatus as in claim 1 wherein the period of the faceted surface is less than 0.5 mm.

13. Apparatus for mixing light beams, said apparatus comprising:

a faceted surface comprising a plurality of parallel first facets alternating with a plurality of parallel second facets to form a sawtooth pattern, said facets being arranged so that a light beam incident on said first facets parallel to said second facets will be deflected by said first facets as a plurality of spaced apart first sub-beams, and a light beam incident on said second facets parallel to said first facets will be by said second facets as a plurality of spaced apart second sub-beams;

a first LED light source which emits a first collimated input beam which is incident on said first facets; and a second LED light source which emits a second collimated input beam which is incident on said second facets.

14. An Apparatus for mixing light beams, said apparatus comprising:

a faceted surface comprising a plurality of parallel first facets alternating with a plurality of parallel second facets to form a sawtooth pattern, said facets being arranged so that a light beam incident on said first facets parallel to said second facets will be deflected by said first facets as a plurality of spaced apart first sub-beams, and a light beam incident on said second facets parallel to said first facets will be by said second facets as a plurality of spaced apart second sub-beams, and so that said first sub-beams will alternate with said second sub-beams and be parallel thereto;

a first LED light source which emits a first input beam which is incident on said first facets; and a second LED light source which emits a second input beam which is incident on said second facets.

* * * * *